Figure 1:
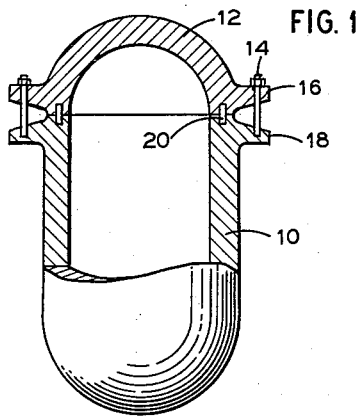

July 27, 1965  E. E. COULTER  3,197,218
SEALING MEANS FOR A PRESSURE VESSEL
Filed Sept. 30, 1963

*INVENTOR.*
Earl E. Coulter
BY
ATTORNEY

United States Patent Office 3,197,218
Patented July 27, 1965

3,197,218
SEALING MEANS FOR A PRESSURE VESSEL
Earl E. Coulter, Akron, Ohio, assignor to The Babcock & Wilcox Company, New York, N.Y., a corporation of New Jersey
Filed Sept. 30, 1963, Ser. No. 312,618
5 Claims. (Cl. 277—171)

The present invention is directed to a sealing means for a pressure vessel and more particularly to pressure vessels of large diameters subject to high internal pressures and temperatures and having large openings therein which are provided with removable closures. These closures must be connected to the openings in a fluid-tight manner capable of withstanding the high internal pressures and yet be readily removable, permitting access to the interior of the vessel.

In various industrial operations large pressure vessels are employed which are operated at very high internal pressures, sometimes exceeding 2000 p.s.i. These operations often require that the interior of the pressure vessel be completely accessible permitting the insertion or removal of large components requiring the opening in the pressure vessel to be substantially equal to the internal diameter thereof. In such structures, operated at very high pressures, large forces are necessary to positively secure the closure members to the pressure vessel openings.

In previous devices it has been difficult to properly seal these closures to prevent the leakage to the outside atmosphere of the pressurized fluid within the vessel. Since these pressurized fluids may be very valuable or highly toxic it is often desirable, if not mandatory, that the closure members be provided with as near an absolute seal against leakage as possible. At the same time, because of the necessity of periodically gaining access to the interior of the pressure vessel, it is necessary that the seals for these removable closure members be readily removable also. In the past seals have been provided by, for example, elastic gaskets or metal O-rings. However, it has been found, in extremely large pressure vessels having full diameter openings, that these types of sealing elements are not completely satisfactory. Leakage has occurred because of the relative movement between the sealing surfaces of the opening caused by pressure changes within the pressure vessel, thermal strains within the pressure vessel material, and relaxation of the sealing forces applied to the closure member. These sealing forces are usually provided by a plurality of circumferentially disposed studs which may relax the sealing force when the stud temperatures lag behind the temperature of the pressure vessel during temperature cycles.

In the past, in order to assure an absolute leak-tight seal, it has been necessary to utilize a semi-toroidal seal membrane welded across the joint between the pressure vessel and the closure member. This type of seal is able to withstand the relative motion between the pressure vessel and the closure member since the membrane is made sufficiently flexible to accommodate these relative movements without rupturing the seal welds. However, the installation and removal of such a seal membrane are both time consuming and expensive since it is necessary to utilize a special machine tool to remove the seal welds accurately enough so that a new membrane can be installed.

The present invention provides a seal for such high pressure closures which combines the desirable features of both gaskets and seal membranes and provides a seal which is both leak-tight, despite differential motion between the mating members, and readily removable without the use of special tools.

Accordingly, the present invention is directed to a sealing assembly which is arranged to form a high pressure seal between two opposed parts having mating surfaces wherein each of the mating surfaces has an inwardly facing groove. These grooves are aligned with each other when the two opposed parts are in operative position. A pair of wedge members are arranged one within each of the grooves, which wedges hold a flexible membrane extending between the grooves in place to form the fluid-tight seal.

Furthermore, the present invention provides a membrane for such a seal having a flexible loop disposed substantially in the center thereof corresponding to the joint between the opposed parts, which loop accommodates differential motion between the opposed parts.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 2:
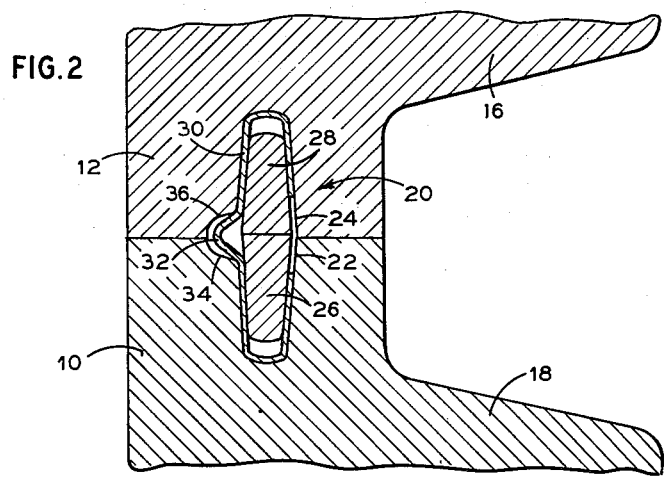
Figure 3:
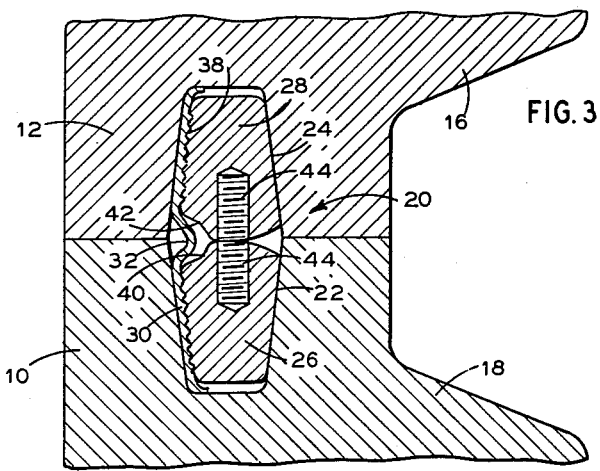

Of the drawings:
FIG. 1 illustrates a pressure vessel having a full diameter opening which may utilize the seal of the present invention;
FIG. 2 is an enlarged portion of a joint between a pressure vessel and a closure member illustrating the seal of the present invention; and
FIG. 3 is a detail of a modification of the seal illustrated in FIG. 2.

Referring to FIG. 1 a pressure vessel 10 is illustrated having a full opening closure head 12 attached to the pressure vessel by a plurality of circumferentially disposed bolts 14 which extend through a flange 16, at the lower extremity of head 12, and connect into a flange 18 disposed around the opening of the pressure vessel 10. In order to assure that the joint between the pressure vessel 10 and the head 12 is leak-tight, a seal 20, circumscribing the opening, is disposed between the two members.

Referring to FIG. 2, an enlarged view of the joint between the pressure vessel 10 and the closure head 12 is illustrated, showing a cross-section of the sealing assembly of the present invention. The mating joint surfaces of the pressure vessel and the closure head are provided with circumferential grooves 22 and 24 respectively, which are so formed as to be in opposed alignment when the closure head is in operative position. Each of the grooves is provided with inwardly tapering side walls. Wedge shaped ring members 26 and 28 respectively are arranged to fit one in each of the grooves. A flexible metal membrane 30 extends across the joint between the pressure vessel 10 and the closure head 12 and is held within the grooves 22 and 24 by wedge-shaped ring members 26 and 28 and forms the leak-tight seal. A loop 32 may be formed in the central portion of the membrane corresponding to the joint between the pressure vessel and the closure member, which loop accommodates differential movement between the members while still providing a leak-tight seal. In order to accommodate the loop 32 in the membrane, secondary grooves 34 and 36 may also be formed in the opposed members adjacent the first named grooves 22 and 24.

Preferably, the included angle of the grooves 22 and 24, and also of the wedge members 26 and 28, is small and is less than the friction angle so that the wedges will remain tightly in place despite differential movement between the opposing members. When the closure member is first attached to the pressure vessel the wedges are driven into the respective grooves, holding the flexible membrane 30 tightly in place and forcing it into a leak-tight fit with the surface of the grooves. Thereafter, regardless of the relative movement of the opposed members, the flexible membrane is held in leak-tight contact with the surface of the grooves with the loop 32 accommodating any differential movement between the members. Even when the sealing force between the opposed members is relaxed, as might occur during temperature cycling of the system, the flexible membrane is still held in sealing engagement with the groove surfaces due to the fact that the included angles of the grooves are less than the friction angle. With this arrangement, any relative motion between the opposed parts such as rotation, separation, or a shearing motion, will not affect the seal but will be accommodated by the flexible membrane through the loop formed in the central portion thereof.

An alternate arrangement of the seal of the present invention is shown in FIG. 3. In this embodiment, the mating surfaces between the wedges 26 and 28 and the flexible membrane 30 are provided with serrations 38 which act to assure the retention of the membrane 30 in the grooves by the wedges. In this embodiment the loop 32 may be formed in the reverse direction from that illustrated in FIG. 2 in which case accommodating grooves 40 and 42 are formed in the wedges. This embodiment also illustrates tapped holes 44 in each of the wedges which may be used for withdrawing the wedges from the grooves when the closure member is removed from the pressure vessel.

A further modification of the present invention may be employed incorporating a soft metallic coating, such as silver plate, on the surface of the flexible membrane in contact with the grooves. This coating further enhances the sealing characteristics of the present invention by permitting the flexible membrane to yield upon application of a sealing force so that it conforms to the surface of the grooves.

Accordingly, it may be seen that the present invention provides a sealing assembly which accommodates differential movement between the parts being joined while assuring a leak-tight seal and yet is relatively easy to assemble and disassemble without requiring special tools.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A sealing assembly arranged to form a high pressure seal between two opposed parts having mating surfaces, each of said mating surfaces having inwardly facing grooves which are aligned when the two opposed parts are in operative position, said grooves having an inwardly tapering side wall, a pair of wedge members constructed and arranged to fit one within each of said tapering grooves, and a flexible membrane extending between said tapering grooves and held in place by said wedges, said membrane having a loop formed substantially in the center thereof and corresponding to the joint between the opposed parts when in operative position, said membrane having a soft metallic coating on the outer surface thereof.

2. A sealing assembly arranged to form a high pressure seal between two opposed parts having mating surfaces, each of said mating surfaces having inwardly facing grooves which are aligned when the two opposed parts are in operative position, said grooves having inwardly tapering side walls, a pair of wedge shaped members constructed and arranged to fit one within each of said tapering grooves and each having an outer face substantially flush with the mating surface of the opposed parts when in operative position, and a flexible membrane extending between said tapering grooves and held in place by said wedges to provide a high pressure resistant seal between said opposed parts, said membrane having a loop formed substantially in the center thereof and corresponding to the joint between the opposed parts when in operative position, said membrane having a soft metallic coating on the outer surface thereof.

3. A sealing assembly arranged to form a high pressure seal between two opposed parts having mating surfaces, each of said mating surfaces having inwardly facing grooves which are aligned when the two opposed parts are in operative position, said grooves having inwardly tapering side walls, a pair of wedge shaped members constructed and arranged to fit one within each of said tapering grooves and each having an outer face substantially flush with the mating surface of the opposed parts when in operative position, a flexible membrane extending between said tapering grooves and held in place by said wedges to provide a high pressure resistant seal between said opposed parts, said membrane having a loop formed substantially in the center thereof and corresponding to the joint between the opposed parts when in operative position, and serrations in the face between said membrane and said wedge shaped members to hold said membrane in operative position.

4. A sealing assembly arranged to form a high pressure seal between two opposed circular parts having annular mating surfaces, each of said surfaces having grooves formed therein which are aligned when the two opposed parts are in operative position, each of said grooves having side walls which taper inwardly from said surface, a pair of annular wedge shaped members constructed and arranged to fit one within each of said tapering grooves, and an annular flexible membrane extending between said tapering grooves and held in place by said wedges, said flexible membrane arranged to extend between said grooves on the inner side of said wedge shaped members between said wedge shaped members and the center thereof.

5. A sealing assembly arranged to form a high pressure seal between two opposed circular parts having annular mating surfaces, each of said surfaces having grooves formed therein which are aligned when the two opposed parts are in operative position, each of said grooves having side walls which taper inwardly from said surface, a pair of annular wedge shaped members constructed and arranged to fit one within each of said tapering grooves, and an annular flexible membrane extending between said tapering grooves and held in place by said wedges, said flexible membrane arranged to extend between said grooves on the inner side of said wedge shaped members between said wedge shaped members and the center thereof, said membrane having a loop formed substantially in the center thereof and corresponding to the joint between the opposed parts when in operative position.

References Cited by the Examiner

UNITED STATES PATENTS 2,422,009   6/47   Goetze _____ 277—171 XR
3,079,033   2/63   Wootton.

LEWIS J. LENNY, *Primary Examiner.*

EDWARD V. BENHAM, *Examiner.*